3,543,516
AUTOMATICALLY SHIFTABLE DIRECTION
CONTROL VALVE
Richard Treichel, Cedar Falls, Iowa, assignor to Deere &
Company, Moline, Ill., a corporation of Delaware
Filed May 19, 1969, Ser. No. 825,835
Int. Cl. F15b 15/18; G05d 11/00
U.S. Cl. 60—52                                     9 Claims

ABSTRACT OF THE DISCLOSURE

An automatically shiftable direction control valve for a tractor hydraulic system wherein there is provided a charging pump, low pressure priority functions such as cooling and lubrication connected to the charging pump, a main pump, a continuously acting reversible function, a single-acting function and a double-acting function all connected to the output of the main pump, and a manually operable direction control valve for each of the functions. The automatically shiftable direction control valve has a restricted passage causing a pressure drop which shifts the valve so as to direct the exhaust of the continuously acting and double-acting functions to the charging circuit and to direct the exhaust of the single-acting function to the fluid resrevoir.

BACKGROUND OF THE INVENTION

The present invention relates to a direction control valve and more specifically relates to an automatically shiftable direction control valve for use with a tractor hydraulic system.

Tractor hydraulic systems are known which include a charging pump connected to a main pump by a charging circuit which feeds low pressure priority functions, for example, cooling and lubrication functions. These hydraulic systems utilize two basic hydraulic return oil circuits. In the first, the return of all the functions supplied by the main pump is connected to the charging circuit, thus leaving the charging pump output primarily for supplying fluid to the low pressure priority functions and in the second, all functions return oil directly to the fluid reservoir, thus, requiring the charging pump to supply the demand of the main pump as well as the demands of the low pressure priority functions. The first of the basic return oil circuits has the disadvantage of requiring single-acting functions to exhaust against the charging circuit pressure. The other of the basic return oil circuits has the disadvantage of requiring the charging pump to be of sufficient capacity to supply the needs of the main pump as well as the needs of the low pressure priority functions. Stated otherwise, if the charging pump does not have a capacity such that the demands of the main pump and the low pressure priority functions will be met, the main pump may take fluid which is needed for cooling and lubrication thus resulting in damage to the parts which are to be cooled and lubricated.

In both types of return oil circuits, it is known to provide a manually actuated valve to respectively connect the return conduit to the sump when single-acting functions are being operated and to connect the return oil circuit to the charging circuit whe double-acting of continuously acting functions are being operated. The disadvantage of a manually actuated valve is that it may be inadvertently left in a position wherein the return oil from the double-acting and continuously acting functions is connected to the sump instead of the charging circuit and result in there being insufficient fluid available to the low pressure priority functions and in the case of the cooling and lubricating functions being deprived, immediate damage would occur.

SUMMARY OF THE INVENTION

According to the present invention, there is provided a direction control valve which is operative to automatically direct the exhaust of a single-acting function to the fluid reservoir and to direct the exhaust of continuously acting or double-acting functions to the charging circuit, so that there is always sufficient oil in the charging circuit to operate certain low pressure priority functions pressurized thereby during the operation of the continuously acting or double-acting functions.

More specifically, it is an object of this invention to provide a direction control valve which shifts to a desired position in response to a differential in hydraulic pressure across the directional control valve caused by pressurizing and exhausting respective hydraulic functions.

A further object of the invention is to provide a valve body defining a bore in which is located a spring for biasing a pressure actuated direction control valve element, the positioning of the spring and valve element being such that malfunctions of the valve element will not result in inadequate supplies of fluid being supplied for cooling and lubricating the tractor engine and transmission.

These and other objects will become more apparent from the following description and accompanying drawing.

DESCRIPTION OF THE PREFERRED EMBODIMENT

Figure 1:
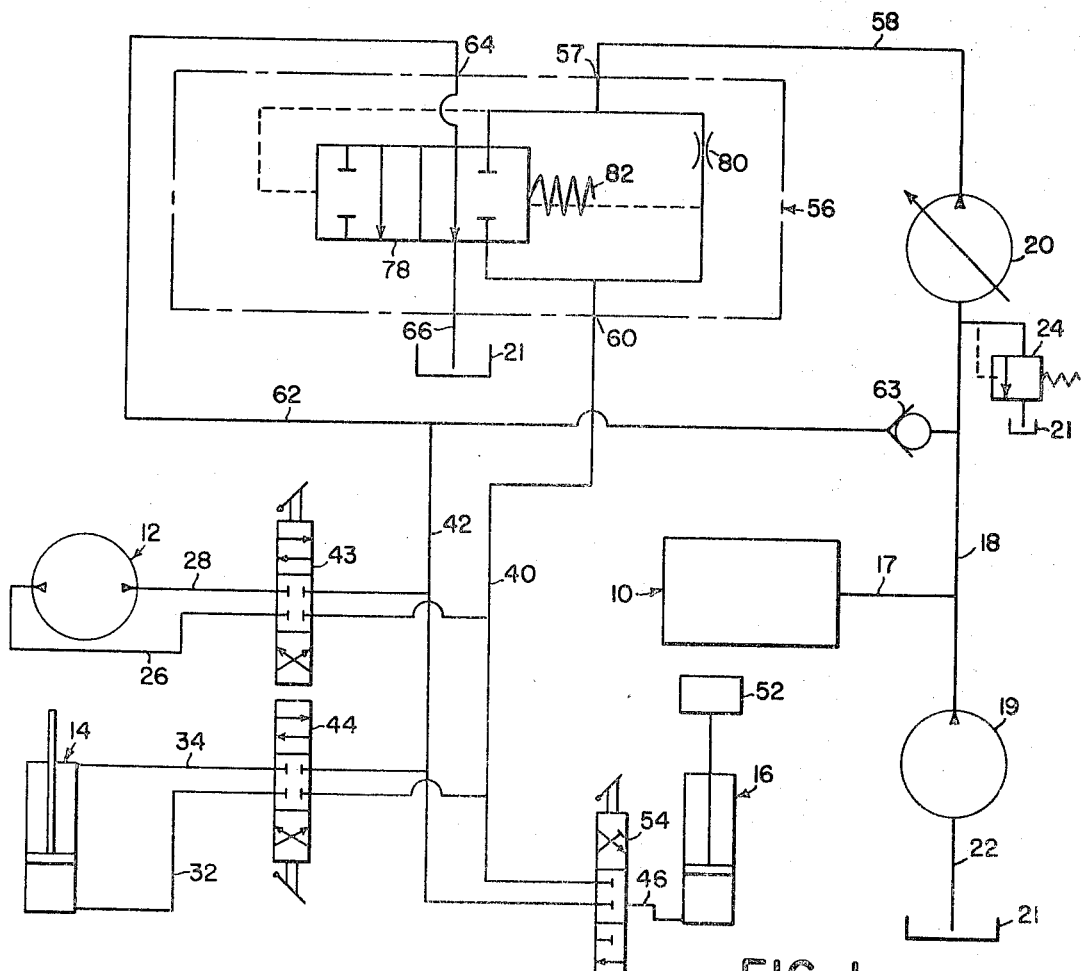
FIG. 1 is a schematic illustration of the tractor hydraulic system in which the present invention is embodied.

The invention embodied in a tractor hydraulic system which is schematically shown in FIG. 1. The hydraulic system includes, by way of example, four different types of functions, namely a low pressure priority function 10 such as a system for supplying oil for cooling and lubricating the tractor engine and transmission, a continuously acting function 12, a double-acting function 14 and a single-acting function 16.

The priority function 10 is connected by means of a conduit 17 to a line or charging circuit 18 which connects the output side of a charging pump 19 with the input side of a main pump 20. The input side of the charging pump 19 is connected to a fluid reservoir 21 by means of a conduit 22. A relief valve 24 is disposed in the line 18 and operates to connect the line 18 to the reservoir 21 when the charging pressure exceeds a predetermined value.

The continuously acting function 12 is represented as a reversible hydraulic motor having alternate inlet conduits 26 tnd 28 and the double-acting function 14 is represented as a two-way cylinder having alternate inlets 32 and 34. The alternate inlets of the functions 12 and 14 are respectively selectively connectible to a pressurized oil feed line 40 or an oil return line 42 by means of similar manually actuated direction control valves 43 and 44, each of which has a central position (the position illustrated) wherein fluid flow is blocked from and to the feed and return lines 40 and 42, a position to one side of the central position wherein the respective function inlet conduits 26 and 32 are connected to the feed line 40 and the respective inlet conduits 28 and 34 are connected to the return line 42, and a position to the other side of the central position wherein the respective function inlet conduits 28 and 34 are connected to the feed line 40 and the inlet conduits 26 and 32 are connected to the return line 42.

The single-acting function 16 is represented as a one-way hydraulic cylinder having a single inlet conduit 46 and is actuatable to move a load represented by the functional box 52. A manually operated direction control valve 54 is movable from a central position (the position illustrated), wherein fluid flow to and from the function 16 is blocked, to a position on one side of the central position, wherein the inlet conduit 46 is connected to the feed line 40, and to a position on the other side of the central position wherein the inlet conduit 46 is connected to the return line 42.

A direction control or dump valve 56 has a first inlet port 57 connected to the output side of the main pump 20 by means of a conduit 58 and a first outlet port 60 connected to the feed line 40. The return line 42 is connected to a line 62, which has one end connected to a second inlet port 64 in the valve 56 and its other end connected to the line 18 between the charging and main pumps. A check valve 63 is disposed in the line 62 to permit flow only from the return line 42 into the line 18. The control valve 56 also has a second outlet or sump port 66 connected to the reservoir.

Figure 2:
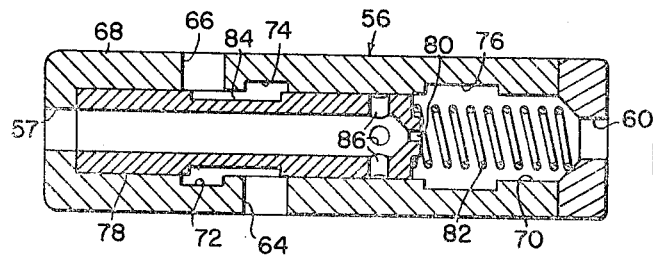
FIG. 2 is an axial section of the direction control valve shown in its normal position wherein it directs return oil to the sump.
Figure 3:
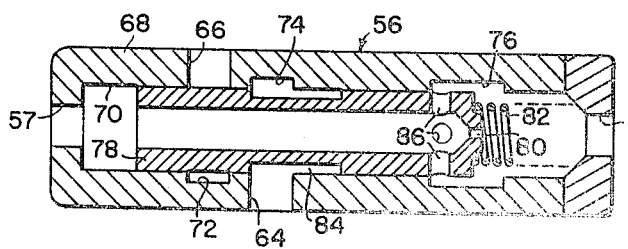
FIG. 3 is a section similar to FIG. 2 but showing the valve shifted into its alternate position wherein it directs return oil to the charging circuit.

The direction control or dump valve 56 is shown in detail in FIGS. 2 and 3 and includes a valve body 68, which defines a generally cylindrical bore 70 connected to the first inlet and outlet ports 57 and 60 respectively, at the left and right ends of the body 68. Intersecting the valve bore 70 at axially spaced positions on opposite sides of the bore 70 are the second inlet and outlet ports 64 and 66, which respectively open into annular grooves 74 and 72 formed in the bore. A further annular groove 76 is formed in the bore 70 adjacent its right end. Positioned snugly within the bore 70 for axial shifting therein is a generally tubular valve member 78, which has a restricted passage or orifice 80 formed in its right end. The valve member 78 is normally held in a first position, shown in FIG. 2, by a compression spring 82 acting between the right ends of the valve member 78 and the valve body 68 so that the left end of the valve member bears against the left end of the valve body. An annular groove 84 formed in the valve member 78 joins the annular grooves 72 and 74 when the valve member 78 is in the first position. The valve member is shiftable to the right against the bias of the spring 82 to a second position, shown in FIG. 3, wherein the annular groove 84 no longer joins the grooves 72 and 74. A plurality of radial ports 86 extend through the tubular valve member 78 adjacent its right end and connect the interior of the valve member 78 to the annular groove 76 only in the second position of the valve member, thereby bypassing the orifice 80.

In operation, assuming that the feed line 40 is fully pressurized and the manually operated direction control valves 43, 44 and 54 are each in their central positions as illustrated in FIG. 1, the pressure across the control valve 56 will be balanced and the control valve member 78 will be in the position shown in FIG. 2, wherein flow from the pressure inlet port 57 to the outlet port 60 is permitted only through the restricted passage 80 to the feed line 40. In this position, the annular groove 84 interconnects the grooves 72 and 74 and the ports 64 and 66 associated therewith, so that the return oil line 42 is connected to the fluid reservoir 21 through the line 62. If either of the manually operated direction control valves 43 and 44, associated respectively with the functions 12 and 14, is shifted so as to connect one of the respective inlets to the feed line 40 and the other of the respective inlets to the return line 42, flow initially passes only through the orifice 80 resulting in a pressure drop across the valve member 78 which causes the valve member 78 to shift to the right to the position illustrated in FIG. 3, wherein flow to the feed line 40 is permitted through the radial ports 86 and wherein the second inlet port 64 and the line 62 connected thereto are blocked from the outlet port 66 and the reservoir 21. This blockage of the flow from the line 62 to the reservoir 21 causes an increase in the pressure, which opens the check valve 63, permitting exhaust flow from the functions 12 and 14 to return to the charging circuit or line 18. The recirculation of the return oil relieves the charging pump of almost all of the demand of the main pump so that nearly the entire output of the charging pump is available for use by the low pressure priority function such as those for lubrication and cooling. This permits a charging pump to be selected which has a maximum capacity just slightly more than that necessary for adequately supplying the low pressure priority functions.

If instead of the functions 12 and 14 being operated, the single-acting function 16 is operated to lift the load 52, the manually operated direction control valve 54 is shifted to the position wherein the feed line 40 is connected to the inlet conduit 46. Again the initial flow through the orifice 80 will cause a pressure drop across the valve member 78, causing the valve member to assume the position shown in FIG. 3 to allow relatively unrestricted flow into the feed line 40. There, of course, will be no flow into the return line 42. If it is desired to lower the load 52, the direction control valve 54 is shifted to the position wherein the inlet conduit 46 is connected to the return line 42. Since, in this case, there is no flow through the valve member 78, there is no pressure drop to shift the valve member to the right, and the valve member remains in the position shown in FIG. 1, wherein fluid in the return line 42 is permitted to flow to the fluid reservoir 21 via the line 62 and the ports 64 and 66, thus permitting the load 52 to lower freely.

It is also to be noted that malfunctions in the operation of the control valve 56 will not cause a loss in return oil resulting in insufficient oil being available for the priority functions 10. For example, assuming that there is a failure in the compression spring 82, the valve member 78 would tend to shift to the right preventing the oil in the line 62 from flowing to the fluid reservoir so that the return oil would flow to the charging circuit to prevent an inadequacy in the amount of oil available for the primary function 10. Assuming that the ports 86 remain unblocked, this would hinder only operation of the single-acting function in the load lowering portion of its cycle. Another example would be if the valve member 78 were to stick. Sticking in the forward position would again result in the line 62 being blocked from the fluid reservoir. If the valve were to stick in the other extreme wherein the return to the fluid reservoir is open, insufficient flow would be allowed through the restricted passage 80 in the valve to operate any of the functions 12, 14 or 16 and the return oil lost would be minimal.

It is to be understood that the action of the direction control valve 56 is described, only as a matter of convenience, with reference to being in a circuit where the continuously-acting, double-acting and single-acting functions are operated selectively and that if it is desirable to operate the functions simultaneously, a separate direction control valve may be provided for at least the single-acting function in order that the single-acting function will not have to lower against the charging circuit pressure as would be the case with respect to the illustrated circuit.

I claim:

1. In a tractor hydraulic system including a reservoir, a charging pump, a priority function such as that for cooling and lubricating the tractor transmission, a main pump, a first conduit means connecting the inlet side of the charging pump to the reservoir, a second conduit means connecting the outlet side of said charging pump to the priority function and inlet side of the main pump, at least one function having pressure and exhaust ports, a single-acting function, direction control valve means for controlling selective operation of said one function and of said single-acting function and including pressure and exhaust ports, a supply conduit means connecting the outlet of the main pump to each of the pressure ports of the direction control valve means and a return conduit means connected to each of the exhaust ports of said control valve means, the improvement comprising: a third conduit means connecting the return conduit means to the second conduit means, a check valve located in said third conduit means for allowing flow only from said third conduit means to said second conduit means, a valve means operatively connected in said supply and return conduit means and including a valve member being shiftable, in response to the single-acting function being exhausted, to a first operative position wherein fluid flow is permitted through the return conduit means to the reservoir and being shiftable, in response to the one function being operated, to a second operative position wherein fluid flow in the return conduit to the reservoir is interrupted whereby the pressure in the return conduit means increases and causes the check valve to open permitting flow of return fluid to said second conduit means.

2. The invention as defined in claim 1 wherein said valve means includes a bore having first inlet and outlet ports for delivering fluid in the supply conduit means from said main pump to said one and single-acting functions and having second inlet and outlet ports for delivering fluid in said return conduit means from the exhaust of said one and single-acting functions to the reservoir, said valve member being positioned within said bore for axial shifting movement between the respective first and second inlet and outlet ports, bias means normally holding said valve member in said first operative position, said valve member having a restricted passage permitting flow between said first inlet and outlet ports and causing a pressure drop for automatically shifting said valve member against the bias means to said second operative position when said one function is operated, said valve member having a bypass outlet for selectively permitting flow between said first inlet and outlet ports and means cooperating between said valve member and said bore for blocking flow from said bypass outlet when said valve member is in said first operative position and for blocking flow through said second inlet and outlet ports when said valve member is in said second operative position.

3. The invention defined in claim 2 wherein the valve member is tubular and said bypass outlet extends radially and wherein the means cooperating between the valve member and bore includes a fluid passage means formed in said bore for communication with said bypass outlet only when said valve member is in said first operative position, and fluid passage means formed in the valve member for communication with said second inlet and outlet ports only when said valve member is in said second operative position.

4. A valve assembly for use in a hydraulic system where it is desirable to control the direction of flow in one fluid circuit according to fluid flow in another fluid circuit comprising: a valve body having first inlet and outlet ports for carrying fluid in a first fluid circuit and second inlet and outlet ports for carrying fluid in a second fluid circuit, valve means in said valve body operatively associated with said first and second inlet and outlet ports and shiftable from a first operative position corresponding to a first rate of flow in said first circuit wherein restricted flow is permitted between said first inlet and outlet ports while simultaneously permitting flow through said second inlet and outlet ports to a second operative position in response to a second rate of flow in said first circuit which is a predetermined amount greater than said first rate of flow wherein relatively unrestricted flow is permitted between said first inlet and outlet ports while flow is simultaneously prevented through said second inlet and outlet ports.

5. The invention defined in claim 4 wherein the valve means includes a generally cylindrical bore in fluid communication with said first and second inlet and outlet ports and a valve member positioned within said bore for axial shifting movement between the respective first and second inlet and outlet ports, bias means normally holding said valve member in said first operative position, said valve member having a restricted passage permitting flow between said first inlet and outlet ports and causing a pressure drop for automatically shifting said valve member against the bias means to said second operative position when said second rate of flow is occurring in the first fluid circuit, said valve member having a bypass outlet for selectively permitting flow between said first inlet and outlet ports and means cooperating between the valve member and the bore for blocking flow from said bypass outlet when the valve member is in the first operative position and for blocking flow through the second inlet and outlet ports when the valve member is in the second operative position.

6. The invention defined in claim 5 wherein the valve member is tubular and said bypass outlet extends radially and wherein the means cooperating between the valve member and bore includes a fluid passage means formed in said bore for communication with said bypass outlet only when said valve member is in said first operative position, and fluid passage means formed in the valve member for communication with said second inlet and outlet ports only when said valve member is in said second operative position.

7. A tractor hydraulic system comprising: a charging pump having an associated reservoir, a charging circuit including at least one low pressure priority function connected to the charging pump, a main pump connected to the charging circuit, at least one function having pressure and exhaust ports, a single-acting function, direction control valve means for controlling selective operation of said one and single-acting functions and including pressure and exhaust ports, a dump valve means having first inlet and outlet ports respectively connected to the main pump and to the pressure ports of the direction control valve means and having second inlet and outlet ports respectively connected to the exhaust ports of the direction control valve means and to the reservoir, conduit means connecting the exhaust ports of said direction control valve means to the charging circuit, a check valve positioned in the conduit means for allowing flow only from the conduit means to the charging circuit, said dump valve means including valve member means operatively associated with said first and second inlet and outlet ports and being responsive to a no flow condition through said first inlet and outlet ports, as when said single-acting function is operated to exhaust, to permit flow through the second inlet and outlets to the reservoir and being responsive to flow through said first inlet and outlet ports, as when said one function is being operated to interrupt flow through said second inlet and outlet ports to the reservoir whereby the pressure in the conduit means increases and causes the check valve to open permitting exhaust fluid to flow into the charging circuit.

8. The invention defined in claim 7 wherein the dump valve means includes a generally cylindrical bore in fluid communication with said first and second inlet and outlet ports and said valve member being positioned within said bore for axial shifting movement between the respective first and second inlet and outlet ports, bias means normally holding said valve member in said first operative position, said valve member having a restricted passage permitting flow between said first inlet and outlet ports and causing a pressure drop for automatically shifting said valve member against the bias means to said second operative position, said valve member having a bypass outlet for selectively permitting flow between said first inlet and outlet ports and means cooperating between the valve member and the bore for blocking flow from said bypass outlet when the valve member is in the first operative position and for blocking flow through the second inlet and outlet ports when the valve member is in the second operative position.

9. The invention defined in claim 8 wherein the valve member is tubular and said bypass outlet extends radially and wherein the means cooperating between the valve member and bore includes a fluid passage means formed in said bore for communication with said bypass outlet only when said valve member is in said first operative position, and fluid passage means formed in the valve member for communication with said second inlet and outlet ports only when said valve member is in said second operative position.

References Cited
UNITED STATES PATENTS

| | | | |
|---|---|---|---|
| 1,789,841 | 1/1931 | Rennick | 137—87 XR |
| 3,222,865 | 12/1965 | Miller | 60—52 |

EDGAR W. GEOGHEGAN, Primary Examiner

U.S. Cl. X.R.

91—414; 137—87